Reissued Sept. 2, 1947 Re. 22,910

UNITED STATES PATENT OFFICE 22,910

LUBRICATING COMPOSITIONS

John G. McNab, Cranford, N. J., Carroll J. Wilson, Marysville, Mich., and Carl Winning, Westfield N. J., assignors to Standard Oil Development Company, a corporation of Delaware No Drawing. Original No. 2,335,017, dated November 23, 1943, Serial No. 425,128, December 31, 1941. Application for reissue May 9, 1945, Serial No. 592,921

4 Claims. (Cl. 252—42.7)

This invention relates to lubricating oils and methods of preparing the same, and more particularly to mineral lubricating oil compositions for use as crankcase lubricants in internal combustion engines.

Because in recent years the requirements for lubricating oils for gasoline and Diesel engines have steadily been made more stringent, it has been proposed to add various ingredients to these oils to improve their behavior in such service. One purpose of these ingredients is to impart detergency to the oils, thus bringing about greater engine cleanliness and avoiding ring sticking, carbon formation and varnish deposition. Certain of these ingredients also impart oxidation resistant properties to oils, thereby tending to inhibit the development of corrosive ingredients in such oils. Corrosion-preventing addition agents are particularly required when the oil is to come in contact with the newer type of alloys of silver and cadmium and of copper and lead, which are now widely used as bearing metals.

Various metal-containing organic compounds which also contain sulfur in a lower state of oxidation have been found particularly useful as detergents as well as corrosion-preventing agents. Such compounds include metallic thiophenolates and thioxanthates, metallic derivatives of various phenol sulfides and disulfides, etc. In use, the effectiveness of these compounds is gradually spent. The detergent capacity becomes exhausted as deterioration products, soot, dirt, varnish, etc., accumulate in the lubricant and saturate the adsorptive power of the additive. In engines equipped with a filter, the latter tends to remove the additive, particularly when the additive is adsorbed on contamination products which are strained out by the filter. The oxidation processes which are underway in an oil during use operate upon the antioxidant functions of the additive and thus also contribute to its exhaustion. The oxidation of the oil also creates insoluble substances which the detergent is called upon to adsorb, thus lessening its capacity for dispersing contamination products which enter the oil, and acidic substances are also formed which may react directly with the detergent to destroy its efficacy. When the detergent is employed also to impart corrosion resistant properties to the oil, the above degradation phenomena all hasten to break down this corrosion resistance.

It is apparent from the foregoing observations that any auxiliary agent capable of stabilizing the oil in the presence of the detergent should materially extend the benefits obtained with the latter. It should also afford protection against corrosion after the detergent has become saturated with dispersed materials or removed by an oil filter. However, the expected additional benefits are not realized when certain well-known corrosion inhibitors and stabilizing agents, such as sulfurized sperm oil, dibenzyl disulfide, triamylphenyl phosphite and the like, are added to the oil containing a metallic detergent agent. In some cases, in fact, the corrosive effect is even increased by adding such compounds.

It has now been found, in accordance with the present invention, that very satisfactory results may be secured by adding to the oil, in addition to the metallic sulfur compound, the reaction product of p-cresol with isobutylene or tertiary butyl alcohol, this compound being more particularly defined in the description which follows. This combination of addition agents provides for detergent action in the early stages of the use of the oil, as well as continued corrosion inhibiting effect after the metallic detergent compound has been removed to some degree by the filter, and whether a filter is or is not used there is a distinct advantage in using the combination of additives here described, since the corrosion of metal surfaces and the formation of deposits on engine parts are notably reduced.

The addition agent which is to serve, in accordance with this invention, as the detergent agent as well as a corrosion preventing agent in the early stages of use, may be defined as an organic compound containing a metal or a basic radical, such as ammonium, sulfonium or phosphonium, etc., and containing also at least one atom of sulphur in divalent form. There may be more than one atom of sulfur in the molecule, but at least one atom of sulfur is divalent and is linked either directly to carbon or to another sulfur atom which in turn is linked directly to carbon. This class of metal-containing sulfur compounds includes metallic derivatives of such organic compounds as the mercaptides, thiophenolates, xanthates, thioxanthates, metallic derivatives of various sulfides and disulfides of phenols, etc. This class of addition agents also includes the corresponding compounds in which sulfur is replaced by selenium or tellurium.

Typical general classes of metal sulfur compounds included within the above definition are the following:

A. *Compounds in which a metal is attached to sulfur*

1. Metallic thioalcoholates or mercaptides RSM.
2. Metallic thiophenolates

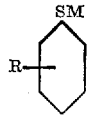

3. Metal salts of thiocarboxylic acids

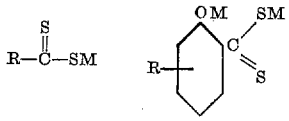

4. Metallic xanthates

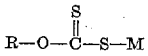

5. Metallic thioxanthates

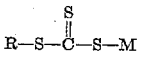

6. Metallic thiocarbonates other than xanthates

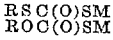

7. Metallic thiocarbamates

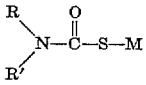

8. Metallic dithiocarbamates

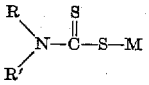

B. *Sulfur compounds in which a metal is attached to elements other than sulfur*

1. Metallo-organic compounds

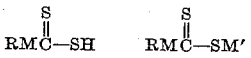

2. Metallic soaps

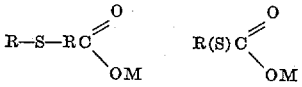

3. Metallic derivatives of thioethers

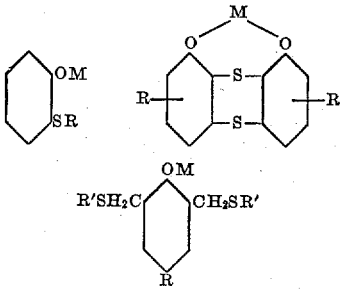

In any of the above formulas, whenever the metal is other than monovalent, the other valences may be satisfied by the same group or by different groups, as, for example, in the following:

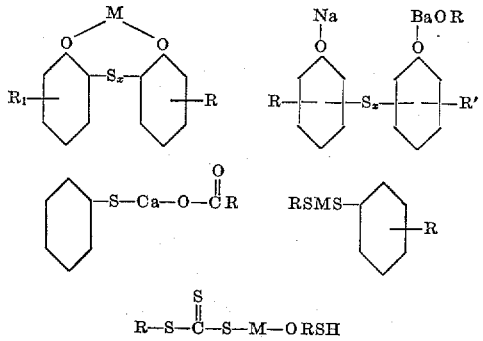

In all of the above formulas R, R′, etc., represent aliphatic or aromatic radicals and M, M′, etc., represent metals or other basic acting units, such as basic radicals. If desired, S may be replaced by Se or Te.

In any of the various types of sulfur compounds named above any of the aromatic or aliphatic radicals may contain further substituent atoms or groups, such as oxygen, sulfur, halogen, nitrogen or phosphorus atoms, as well as groups such as alkyl, aralkyl, aryl, cycloalkyl, —OH, —SH, —$NH_2$, —NH (alkyl), —N (alkyl)$_2$, —O (alkyl), —O (aryl), —S (alkyl), —S (aryl), —CO (alkyl), —CO (aryl), —CHO, and —COO (alkyl).

A preferred group of compounds for use in the present invention is that containing the radical defined by the formula $$MXR(S)_n—$$

in which M is a metal or a basic radical, X is oxygen or sulfur which is attached to a carbon atom which is in turn attached only to hydrogen and/or other carbon atoms. In the above formula R is an aliphatic or aromatic radical and $n$ is an integer, 1 to 4.

A particularly preferred group of compounds are the metal salts of phenolic thioethers $$MXAr(R)—S_n—(R)ArXM$$

in which M is a metal, X is oxygen or sulfur, Ar is an aromatic nucleus, R is an organic group, S is sulfur and $n$ is an integer, 1 to 4. Ar may represent a single benzene ring or a condensed ring system and the substituents R may be alkyl, aryl, aralkyl, alkaryl, or substituted groups and may occur more than once in each ring. The group $S_n$ may have any of the following configurations:

(1) —S—, —S—S—, —S—S—S—, etc.

(2) —S(=S)—

(3) —S—S(=S)—S—

(4)

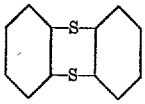

The radicals represented by R in the above formula should be of sufficient size to impart adequate oil solubility to the compounds and such alkyl radicals as butyl, amyl, tert.-octyl, decyl, cetyl, and stearyl have been found satisfactory. Whenever the diisobutyl group is mentioned in this specification, the tetramethylbutyl radical, formed by polymerizing isobutylene, is meant.

When the phenolic groups are alkylated with petroleum olefinic hydrocarbons, such as refinery gases and the like, the resulting products may comprise a mixture of compounds with different sizes of alkyl groups. Mixtures of metal-containing sulfur compounds prepared from such mixed alkyl groups are also contemplated in this invention.

In some cases the phenolic compounds may be alkylated with long chain groups such as those derived from petroleum wax or an ester wax. In such cases one wax group may be attached to each aryl group or several aryl groups may be attached to one wax group at several points along the chain, as represented below.

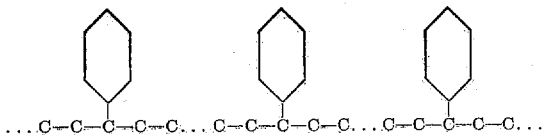

It should be understood, of course, that these are merely examples of the types of compounds which can be formed during alkylation and that the invention is not to be limited by this description.

Among the compounds falling in the preferred class those most frequently used are the sulfides or disulfides of metallic derivatives of phenols, for example, barium bis-(tert. octyl phenoxy) sulfide, magnesium bis-(tertiary amyl phenoxy) sulfide, and the various metallic salts of alkylated hydroxybenzyl sulfide and alklated bis-(hydroxybenzyl) disulfide.

The metals of the above described class of compounds may be selected from any of the metallic groups, but are preferably members of groups I, II, III, IV or VIII of the periodic table. Particularly desirable are group II metals, barium, calcium, magnesium, and zinc, and in addition, cobalt, nickel and tin. In place of the metals there may be substituted any of the well-known basic radicals, such as ammonium or the various onium groups, such as the quaternary ammonium base radicals and the corresponding sulfonium, phosphonium, arsonium or pyridonium radicals and the like.

These compounds may be prepared by any well-known methods. For example, barium bis-(tert. octyl phenoxy) sulfide may be prepared by alkylating phenol with diisobutylene, followed by treatment with sulfur chloride to form the thioether and finally saponification with barium hydroxide to form the salt. The invention is not to be limited by any method of preparing these additives, however.

The following is a description of one method which has been used for preparing barium bis-(tert. octyl phenoxy) sulfide (barium salt of diisobutyl hydroxy phenyl sulfide).

EXAMPLE 1

A 31% solution of tert. octyl phenol in chloroform, containing a total of 217 lbs. of tert. octyl phenol, was placed in a reaction vessel. Over a period of 3 hours 80.6 lbs. of sulfur chloride, $SCl_2$, were added gradually, the temperature of the mixture being held at 20–25° C. Following this step, the mixture was heated under reflux for two hours and the chloroform then removed by heating to 100° C. Finally, the product was blown with carbon dioxide for several hours until neutral to Congo red paper.

The amount of tert. octyl hydroxy phenyl sulfide present in the reactor after the above procedure was estimated to be 238 pounds. About 395 lbs. of an extracted Mid-Continent lubricating oil (about 52 secs. viscosity (Saybolt) at 210° F.) were pumped into the reactor and mixed with the tert. octyl hydroxy phenyl sulfide. While agitation was continued, the temperature was raised to 210° F. and a stream of nitrogen under 2 lbs./sq. in. pressure was blown in at the bottom of the reactor. Then 75 lbs. of stearyl alcohol were added and the temperature raised to 230° F. Gradual addition of 185 lbs. of a technical grade of barium hydroxide octahydrate, $Ba(OH)_2.8H_2O$, was then begun, the temperature first being raised to 240° F. and the stream of nitrogen continued.

After about 85% (163 lbs.) of the barium hydroxide had been added (requiring about 6 hours) excessive foaming occurred, but it was found that this could be controlled by raising the temperature to 250° F., whereupon the balance of the barium hydroxide was added. Following this, the batch was blown with nitrogen for one hour at 230° F. to remove all water. Four pounds of "Hyflow" filter aid were added and the mixture filtered at 260° F., yielding a concentrate of oil containing 40% of the barium salt of tert. octyl hydroxy phenyl sulfide and 10% of stearyl alcohol. Analysis indicated 9.02% barium, almost exactly the theoretical amount for a 40% solution of the barium salt of tert. octyl hydroxy phenyl sulfide, $Ba(O—C_6H_3—C_8H_{17})_2S$.

The second addition agent, which for convenience is referred to throughout this specification as "Additive B," to be added to the lubricating oil base in addition to a metallic sulfur compound of the above described class, may be defined as the product obtained by reacting p-cresol with isobutylene or tertiary butyl alcohol in the presence of a catalyst, e. g., sulfuric acid, such product having a molecular weight of about 220, a chemical composition corresponding to the empirical formula $C_{15}H_{24}O$, and being, when purified, a white crystalline solid having a melting point of about 69.2°–69.4° C. A satisfactory method for the preparation of this compound is as follows: p-Cresol is mixed with about 5% of its weight of 96% commercial sulfuric acid and agitated at about 70° C. while isobutene is bubbled through the mixture. After completion of the reaction, as indicated by the flow of isobutene from the gas exit, the reaction mixture is blown with steam and washed with hot water and dilute alkali until neutral. A high yield of an oily material is obtained, which readily crystallizes on cooling. The product may be recrystallized from hot alcohol. The same product may be obtained by reacting p-cresol with tertiary butyl alcohol. In this case the amount of sulfuric acid catalyst is preferably quite large, i. e., of the order of one mol of catalyst per mol of p-cresol. Temperatures from about 0° to about 50° C. may be used, preferably from 25° to 40° C.

The lubricating oil base stocks of this invention may be straight mineral lubricating oils or distillates derived from paraffinic, naphthenic, asphaltic or mixed base crudes, or, if desired, various blended oils may be employed as well as residuals, particularly those from which asphaltic constituents have been carefully removed. The oils may be refined by conventional methods using acid, alkali and/or clay or other agents such as aluminum chloride, or they may be extracted oils produced, for example, by solvent extraction with solvents of the type of phenol, sulfur dioxide, furfural, dichloro ethyl ether, propane, nitrobenzene, crotonaldehyde, etc. Hydrogenated oils or white oils may be employed as well as synthetic oils prepared, for example, by the polymerization of olefins or by the reaction of oxides of carbon with hydrogen or by the hydrogenation of coal or its products. In certain instances cracking coil tar fractions and coal tar or shale oil distillates may also be used. Also, for special applications, animal, vegetable or fish oils or their hydrogenated or voltolized products may be employed, either alone or in admixture with mineral oils.

For the best results, however, the base stock chosen should usually be that oil which without the additive present gives the optimum performance in the service contemplated. Since one advantage of the additives is that their use also makes feasible the employment of less satisfactory mineral oils or other oils, no strict rule can be laid down for the choice of the base stock. Certain essentials must of course be observed. The oil must possess the viscosity and volatility characteristics known to be required for the service contemplated. The oil must be a satisfactory solvent for the additive, although in some cases auxiliary solvent agents may be used. The lubricating oils, however they may have been produced, may vary considerably in viscosity and other properties depending upon the particular use for which they are desired, but they usually range from about 40 to 150 seconds Saybolt viscosity at 210° F. For the lubrication of medium and high speed Diesel engines the general practice has been to use a lubricating oil base stock prepared from naphthenic or aromatic crudes and having a Saybolt viscosity at 210° F. of 45 to 90 seconds and a viscosity index of 0 to 50. However, in certain types of Diesel service, and in gasoline engine service, oils of higher viscosity index are often required, for example, up to 75 or 100, or even higher, viscosity index.

In addition to the materials to be added according to the present invention, other agents may also be used such as dyes, pour depressors, heat thickened fatty oils, sulfurized fatty oils, organo metallic compounds, metallic or other soaps, sludge dispersers, antioxidants, thickeners, viscosity index improvers, oiliness agents, resins, rubber, olefin polymers, voltolized fats, voltolized mineral oils, and/or voltolized waxes, and colloidal solids such as graphite or zinc oxide, etc. Solvents and assisting agents, such as esters, ketones, alcohols, aldehydes, halogenated or nitrated compounds, and the like, may also be employed.

Assisting agents which are particularly desirable are the higher alcohols having 8 or more carbon atoms and preferably 12 to 20 carbon atoms. The alcohols may be saturated straight and branched chain aliphatic alcohols such as octyl alcohol, $C_8H_{17}OH$, lauryl alcohol, $C_{12}H_{25}OH$, cetyl alcohol, $C_{16}H_{33}OH$, stearyl alcohol, sometimes referred to as octadecyl alcohol, $C_{18}H_{37}OH$, and the like; the corresponding olefinic alcohols such as oleyl alcohol; cyclic alcohols, such as naphthenic alcohols; and aryl substituted alkyl alcohols, for instance, phenyl octyl alcohol, or octadecyl benzyl alcohol or mixtures of these various alcohols, which may be pure or substantially pure synthetic alcohols. One may also use mixed naturally occurring alcohols such as those found in wool fat (which is known to contain a substantial percentage of alcohols having about 16 to 18 carbon atoms) and in sperm oil (which contains a high percentage of cetyl alcohol); and although it is preferable to isolate the alcohols from those materials, for some purposes the wool fat, sperm oil or other natural products rich in alcohols may be used per se. Products prepared synthetically by chemical processes may also be used, such as alcohols prepared by the oxidation of petroleum hydrocarbons, e. g., paraffin wax, petrolatum, etc.

Generally the amount of each of the additives of the present invention in the finished lubricant composition should be between the approximate limits of 0.02% and 2.0%, and preferably between 0.1% and 1.0%, the exact amount to be used depending to a certain extent on the particular compounds used, the character of the oil base and the operating conditions of the engine in which the lubricant is to be used.

In the following examples are described several tests of the effects of various combinations of additives upon the properties of lubricating oils, illustrating the advantages obtained by the presence of additive B, defined above. In all cases additive B was prepared by the method described above in detail.

The first two of the following examples show the effect of the use of additive B upon the corrosion of copper-lead bearings when used in combination with a metal-containing sulfur compound in a lubricating oil, as compared with the use of several known corrosion inhibitors in combination with the same metallic sulfur compounds. In these examples the well-known corrosion inhibitors had only an adverse effect on the corrosive properties of the oil, while additive B aided considerably in preventing corrosion.

Example 2

Samples of oil blends containing, separately, well-known corrosion inhibitors as well as additive B of the present invention, in addition to one or more of the metal-containing sulfur compounds of the present invention, as well as samples of oil containing the same metal sulfur compounds, but with the omission of the second corrosion inhibitor, were submitted to a bearing corrosion test in which the extent of weight loss of alloy bearings, due to corrosion by the oils, was determined. This test was conducted as follows:

500 cc. of the oil were placed in a glass oxidation tube (13" long and 2⅝" diameter) fitted at the bottom with a ¼" bore air inlet tube perforated to facilitate air distribution. The oxidation tube was then immersed in a heating bath so that the oil temperature was maintained at 325° F. during the test. Two quarter sections of automotive bearings of copper-lead alloy of known weight and having an area of 50 sq. cm. were attached on opposite sides of a stainless steel rod which was then immersed in the test oil and rotated at 600 R. P. M., thus providing sufficient agitation of the sample during the test. Air was then blown through the oil at the rate of 2 cubic feet per hour. At the end of each hour fresh bearings were supplied and 15% of the oil in the oxidation tube was removed and a corresponding amount of fresh oil was added. After the bearings were removed in each test, they were washed with naphtha and weighed to determine the amount of bearing weight lost by corrosion. The tests were continued in each case until the cumulative weight loss of all the bearings tested with a given oil blend was 50 milligrams.

A refined lubricating oil of S. A. E. 20 grade and consisting of an extracted Mid-Continent paraffinic oil was blended with 0.5% of barium bis-(diisobutyl phenoxy) sulfide, 0.5% of barium bis-(diisobutyl phenoxy) disulfide and 0.25% of stearyl alcohol. A sample of this blend was submitted to the above described test, as well as samples of the same blended, respectively, with 1% of sulfurized polymer oil, 1% of sulfurized sperm oil, 0.25% of dibenzyl disulfide, and 0.5% of additive B. (Polymer oil as used in these examples comprises synthetic oils falling in the lubricating oil range prepared by polymerization of isobutylene with boron fluoride.) The results are shown in Table I, in which the "bearing life" refers to the number of hours which elapsed to produce a cumulative bearing weight loss of 50 milligrams.

*Table I*

| Oil | Bearing Life, Hrs. |
|---|---|
| (A) Base Oil+0.5% barium bis-(tert. octyl phenoxy) sulfide+0.5% barium bis-(tert. octyl phenoxy) disulfide+0.25% stearyl alcohol | 8.2 |
| (B) Oil A+1.0% sulfurized polymer oil | 7.0 |
| (C) Oil A+1.0% sulfurized sperm oil | 6.1 |
| (D) Oil A+0.25% dibenzyl disulfide | 5.0 |
| (E) Oil A+0.5% Additive B | 17.5 |

The results given in Table I clearly show that the various sulfur compounds commonly advocated as inhibitors of corrosion actually increased corrosiveness when used in the compounded lubricant, whereas additive B markedly decreased the corrosiveness and actually more than doubled the bearing life of the oil.

EXAMPLE 3

In this example, a refined mineral lubricating oil base of S. A. E. 30 grade, consisting of 35% of extracted Coastal oil and 65% of paraffinic oil, was blended with 0.25% of barium bis-(diisobutyl phenoxy) sulfide, 0.25% of barium bis-(diisobutyl phenoxy) disulfide and 0.125% of stearyl alcohol. Samples of this blend alone and with the addition of 0.25% of triphenyl phosphite were each submitted to a test similar to that described in Example 2. The results are shown in Table II, in which the actual cumulative loss in bearing weight at the end of each second hour during the test is recorded.

*Table II*

| Oil | Cumulative Bearing Weight Loss, mg. | | | | | | | |
|---|---|---|---|---|---|---|---|---|
| | 2 Hours in Test | 4 Hours in Test | 6 Hours in Test | 8 Hours in Test | 10 Hours in Test | 12 Hours in Test | 14 Hours in Test | 16 Hours in Test |
| (A) Base oil+0.25% barium bis-(tert. octyl phenoxy) sulfide+0.25% barium bis-(tert. octyl phenoxy) disulfide+0.125% stearyl alcohol | 10 | 22 | 41 | 76 | 106 | 161 | 253 | 409 |
| (B) Oil A+0.25% triphenyl phosphite | 6 | 17 | 45 | 113 | 223 | 346 | | |

It can be seen that the triphenyl phosphite actually increased the corrosiveness of the compounded oil rather than decreased it, which is surprising in view of the known effect of this additive as a corrosion inhibitor in the absence of sulfur-containing metallic compounds.

In the following series of tests, described as Examples 4, 5, and 6, various oil blends containing, separately or in the same oil, the preferred addition agents of the present invention, were submitted to tests similar to that described in Example 2, the modifications in each case being indicated below. The results shown indicate the advantageous use of the preferred combination of addition agents which constitutes the present invention.

EXAMPLE 4

Samples of a base oil of S. A. E. 30 grade, alone and mixed with one or more of the additives of the present invention, were submitted to the corrosion test described in Example 2, using copper-lead bearings as before, and the results are shown in Table III.

These data show that the corrosiveness of the mineral oil is somewhat reduced by adding the barium salts of bis-(tert. octyl phenoxy) sulfide and disulfide plus stearyl alcohol, the blend taking 16 hours to corrode the bearings as much as the mineral oil alone did in 6 to 7 hours. By adding to this compounded oil a small amount of additive B the corrosiveness is still further reduced, the weight loss with this oil (oil D) in 24 hours not being as much as in 5 hours with the uncompounded oil. On the other hand, if the same amount of additive B is added to the mineral oil without the metallic additives the resulting blend (oil C) is more corrosive than the oil containing no additive B but containing the alcohol and metal compounds (oil B).

*Table III*

| Oil | Cumulative Bearing Weight Loss, mg. | | | | | | | | | | |
|---|---|---|---|---|---|---|---|---|---|---|---|
| | 1 Hour of Test | 2 Hours of Test | 3 Hours of Test | 4 Hours of Test | 5 Hours of Test | 6 Hours of Test | 7 Hours of Test | 8 Hours of Test | 12 Hours of Test | 16 Hours of Test | 24 Hours of Test |
| (A) Refined mineral oil (S. A. E. 30) | 4 | 8 | 24 | 47 | 85 | 136 | 200 | | | | |
| (B) Oil A+0.325% barium bis-(tert. octyl phenoxy) sulfide+0.325% barium bis-(tert. octyl phenoxy) disulfide+0.163% stearyl alcohol | 2 | 4 | 5 | 8 | 12 | 15 | 19 | 24 | 32 | 155 | |
| (C) Oil A+0.25% Additive B | 2 | 4 | 6 | 8 | 10 | 13 | 18 | 23 | 81 | 180 | |
| (D) Oil B+0.25% Additive B | 4 | 6 | 8 | 11 | 13 | 15 | 19 | 23 | 30 | 42 | 73 |

EXAMPLE 5

The oil blends as described in this example were submitted to bearing corrosion tests similar to the test described in Example 2, except that in the present case the bearings were replaced only after four hour intervals and the area of each test bearing was 25 sq. cm. The cumulative weight losses at the end of the various four hour periods are indicated in Table IV:

*Table IV*

| Oil | Cumulative Bearing Weight Loss, mg. | | | | | | |
|---|---|---|---|---|---|---|---|
| | 4 Hrs. | 8 Hrs. | 12 Hrs. | 16 Hrs. | 20 Hrs. | 24 Hrs. | 28 Hrs. |
| (A) Refined mineral lubricating oil (S. A. E. 20) | 1 | 252 | | | | | |
| (B) Oil A+1.0% barium bis-(tert. octyl phenoxy) sulfide | 2 | 4 | 7 | 147 | | | |
| (C) Oil B+0.25% Additive B | 2 | 5 | 5 | 14 | | | |
| (D) Oil A+1.0% nickel dicyclohexyl dithiocarbamate | 0 | 2 | 4 | 6 | 10 | 75 | |
| (E) Oil D+0.25% Additive B | 1 | 4 | 5 | 7 | 9 | 15 | 18 |
| (F) Oil A+1.0% barium bis-(tert. octyl hydroxy benzyl amyl) sulfide | 0 | 0 | 7 | 29 | 150 | | |
| (G) Oil F+0.25% Additive B | 0 | 0 | 1 | 3 | 10 | 105 | |

These data show that although the addition of a metal salt of a sulfur-containing compound in each case reduced the corrosiveness of the uncompounded mineral oil to some extent, a much greater improvement was obtained by adding additive B.

EXAMPLE 6

Other oil blends were tested in the manner described in Example 2, except that in this case two copper-lead bearing halves and two cadmium-silver bearing halves were placed alternately on opposite sides of the stainless steel rod and immersed in the oil samples as previously described and the tests conducted for five hours. Table V shows the total bearing loss in each case.

*Table V*

| Oil | Five Hour Corrosion Test Bearing Weight Loss, Mg. | |
|---|---|---|
| | Copper-Lead | Cadmium-Silver |
| (A) Conventionally refined Coastal naphthenic oil (55 secs. vis. Saybolt at 210° F.)+0.5% cobalt bis-(tert.-amyl phenoxy) disulfide | 12 | 1 |
| (B) Oil A+0.5% Additive B | 2 | 1 |

These data further demonstrate that additive B of the present invention inhibits the corrosiveness of compounded oils toward alloy bearings. Similar results were also obtained in a different type of corrosion test as shown in Example 7.

EXAMPLE 7

Oil blends were also subjected to the standard Underwood bearing corrosion test, which was conducted as follows:

The polished bearings of the Underwood machine were thoroughly abraded with emery cloth so that corrosion would proceed uniformly and then accurately weighed. The apparatus was filled with 1500 cc. of the lubricant under test and the pump and heater started. The oil pressure was regulated to 10 pounds per square inch by means of by-pass valves and maintained at this pressure throughout the test. As soon as the temperature of the oil reached 275° F. the heater and pump were turned off just long enough to put the already prepared and weighed bearings in place. Two copper-lead and two cadmium-silver bearing halves were used simultaneously in each test. At the end of 20 hours the bearings were removed, cleaned with naphtha, dried and weighed. The weight loss was taken as a measure of the corrosiveness of the oil.

In Table VI are shown the results of tests using the above procedure. The base oil consisted of a conventionally refined Coastal oil having a viscosity of 55 seconds Saybolt at 210° F.

*Table VI*

| Oil | Bearing Weight Loss, mg. | |
|---|---|---|
| | Copper-Lead | Cadmium-Silver |
| (A) Base oil+0.5% cobalt bis-(tert.-amyl phenoxy) sulfide | 10 | 1 |
| (B) Oil A+0.5% Additive B | 4 | 1 |

In the examples which follow there are given results of tests of several oil blends run in various engines operating under different degrees of severity. These examples serve further to show the advances to be gained by using in a lubricating oil a combination of additive illustrating the present invention.

EXAMPLE 8

A mineral lubricating oil blend containing metal salts of sulfur compounds as described below and a similar blend containing in addition additive B were each tested for 500 hours in a General Motors 3-cylinder Diesel engine. The following engine conditions prevailed in each test: speed, 2000 R. P. M.; power output, 80 brake H. P.; back pressure, 6 in. of mercury; water temperature, 180° F.; oil sump temperature, 230° F.; intake air temperature, 105° F. Results obtained, expressed on a demerit rating system, are shown in Table VII. Bearing weight losses are also given. With regard to the engine demerit ratings, it should be borne in mind that the lower the value is, the better the engine condition.

*Table VII*

| Oil | Engine Demerits | | Copper-Lead Connecting Rod Bearing Weight Loss, mg. |
|---|---|---|---|
| | Valves | Ring Zone | |
| (A) S. A. E. 30 Base oil (35% extracted Coastal+65% paraffinic)+0.324% barium bis-(tert. octyl phenoxy) sulfide+0.324% barium bis-(tert. octyl phenoxy) disulfide+0.162% stearyl alcohol | 2.00 | 3.45 | 202 |
| (B) Oil A+0.25% Additive B | 1.75 | 3.29 | 86 |

These results show that additive B not only reduced the corrosiveness of the compounded oil toward the alloy connecting rod bearings but also improved the detergent action of the oil as shown by the ring zone and valve condition of the engine.

EXAMPLE 9

Similar engine demerit tests were conducted for 168 hours in a Hercules Diesel engine at 1500 R. P. M., with an oil temperature of 210° F. and a water temperature of 180° F. The results are shown in Table VIII.

*Table VIII*

| Oil | Duration of Test, Hrs. | Engine Demerits | | | | Bearing Weight Loss, 6 Rods, mg. |
|---|---|---|---|---|---|---|
| | | Overall | Ring Zone | Sludge | Piston Skirts | |
| (A) S. A. E. 30 Base oil (35% extracted Coastal+65% paraffinic)+0.325% barium bis-(tert. octyl phenoxy) sulfide+0.325% barium bis-(tert. octyl phenoxy) disulfide +0.163% stearyl alcohol | 84 | 2.50 | 3.18 | 1.35 | 4.17 | 466 |
| | 168 | 3.31 | 4.11 | 1.73 | 4.42 | 1119 |
| (B) Oil A+0.25% Additive B | 84 | 1.86 | 2.96 | 0.88 | 3.25 | 165 |
| | 168 | 2.53 | 3.66 | 1.42 | 4.08 | 547 |

In this engine also additive B reduced the tendency of the compounded oil to corrode the bearings and improved the cleanliness of the engine. With this additive the engine condition was substantially no worse after 168 hours of operation than it was after only 84 hours of operation when the additive was not present.

EXAMPLE 10

Other engine tests were conducted with a C. F. R. single cylinder engine at 1800 R. P. M. for 60 hours, the oil temperature being 200° F. and the water temperature 200° F. The results are shown in Table IX.

*Table IX*

| Oil | Overall Engine Demerit |
|---|---|
| (A) Base oil (65% paraffinic, S. A. E. 30+35% extracted Coastal S. A. E. 60) | 1.68 |
| (B) Oil A+0.325% barium bis-(tert. octyl phenoxy) sulfide+0.325% barium bis-(tert. octyl phenoxy) disulfide+0.163% stearyl alcohol | 1.43 |
| (C) Oil B+0.25% Additive B | 1.18 |

Here again additive B markedly improved the engine performance of the compounded oil, the lower demerit rating indicating that the engine was in a much cleaner condition.

In addition to being employed in crankcase lubricants for Diesel and automotive engines, the additives of the present invention may also be used in light mineral oils such as spindle oils and textile oils, metal cutting oils, turbine oils, insulating and transformer oils, steam cylinder oils and greases. Also, since these additives achieve their detergent effect by modifying surface activity, their use in asphalt, road oils and waxes to improve wetting and adhesive properties is also contemplated. Likewise, they may be added to liquids fuels to increase their wetting ability for metals, enabling them to displace moisture which might otherwise cause corrosion of containers, fuel lines, pump parts, and the like.

This invention is not to be considered as limited by any theory as to the action of the various additives nor by any of the examples mentioned or described herein which are given for illustrative purposes only, but is to be limited solely by the terms of the appended claims.

We claim:

1. A lubricating composition consisting essentially of a lubricating oil base having incorporated therein a small amount, sufficient to stabilize said oil base, of a product formed by reacting p-cresol with an agent which furnishes a tertiary butyl group, selected from the class consisting of isobutylene and tertiary butyl alcohol, in the presence of a catalytic amount of sulfuric acid of about 96% concentration, the quantities of p-cresol and the agent which furnishes a tertiary butyl group being such and the reaction carried to such point that a product having a molecular weight of about 220 and an approximate empirical formula of $C_{15}H_{24}O$ results, the temperature of the reaction being about 70° C. in the case of a reaction with isobutylene and about 25 to 50° C. in the case of a reaction with tertiary butyl alcohol, and a small amount, sufficient to impart detergent properties to the composition, of a compound of the formula $$MOAr(R)—S_n—(R)ArOM$$

in which M is a metal of group II of the periodic able, Ar is an aromatic nucleus, R is at least one alkyl group, and $n$ is an integer, 1 to 4.

2. A lubricating composition consisting essentially of a mineral lubricating oil base having incorporated therein a small amount, sufficient to stabilize said oil base, of a product formed by reacting p-cresol with isobutylene in the presence of a catalytic amount of sulfuric acid of about 96% concentration at a temperature of about 70° C., the quantities of p-cresol and isobutylene being such and the reaction being carried to such point that a product having a molecular weight of about 220 and an approximate empirical formula of $C_{15}H_{24}O$ results, and a small amount, sufficient to impart detergent properties to the composition, of barium bis-(tert.-octyl phenoxy) sulfide.

3. A lubricating composition consisting essentially of a mineral lubricating oil base having incorporated therein a small amount, sufficient to stabilize said oil base, of a product formed by reacting p-cresol with isobutylene in the presence of a catalytic amount of sulfuric acid of about 96% concentration at a temperature of about 70° C., the quantities of p-cresol and isobutylene being such and the reaction being carried to such point that a product having a molecular weight of about 220 and an approximate empirical formula of $C_{15}H_{24}O$ results, and about 0.02% to 2.0% of barium bis-(tert.-octyl phenoxy) sulfide.

4. A lubricating composition consisting essentially of a mineral lubricating oil base having incorporated therein about 0.5% of a product formed by reacting p-cresol with isobutylene in the presence of a catalytic amount of sulfuric acid of about 96% concentration at a temperature of about 70° C., the quantities of p-cresol and isobutylene being such and the reaction being carried to such point that a product having a molecular weight of about 220 and an approximate empirical formula of $C_{15}H_{24}O$ results, about 0.5% of barium bis-(tert.-octyl phenoxy) sulfide, about 0.5% of barium bis-(tert.-octyl phenoxy) disulfide, and about 0.25% of stearyl alcohol.

JOHN G. McNAB.
CARROLL J. WILSON.
CARL WINNING.

REFERENCES CITED

The following references are of record in the file of this patent:

UNITED STATES PATENTS

| Number | Name | Date |
|---|---|---|
| 2,202,877 | Stevens | June 4, 1940 |
| 2,265,851 | Mathieson | Dec. 9, 1941 |
| 2,270,183 | Cook | Jan. 13, 1942 |
| 2,374,559 | Morris et al. | Apr. 24, 1945 |